June 8, 1926.
R. F. METZLER ET AL
1,587,541
AUTOMOBILE BODY CONSTRUCTION
Filed Nov. 13, 1925   2 Sheets-Sheet 1
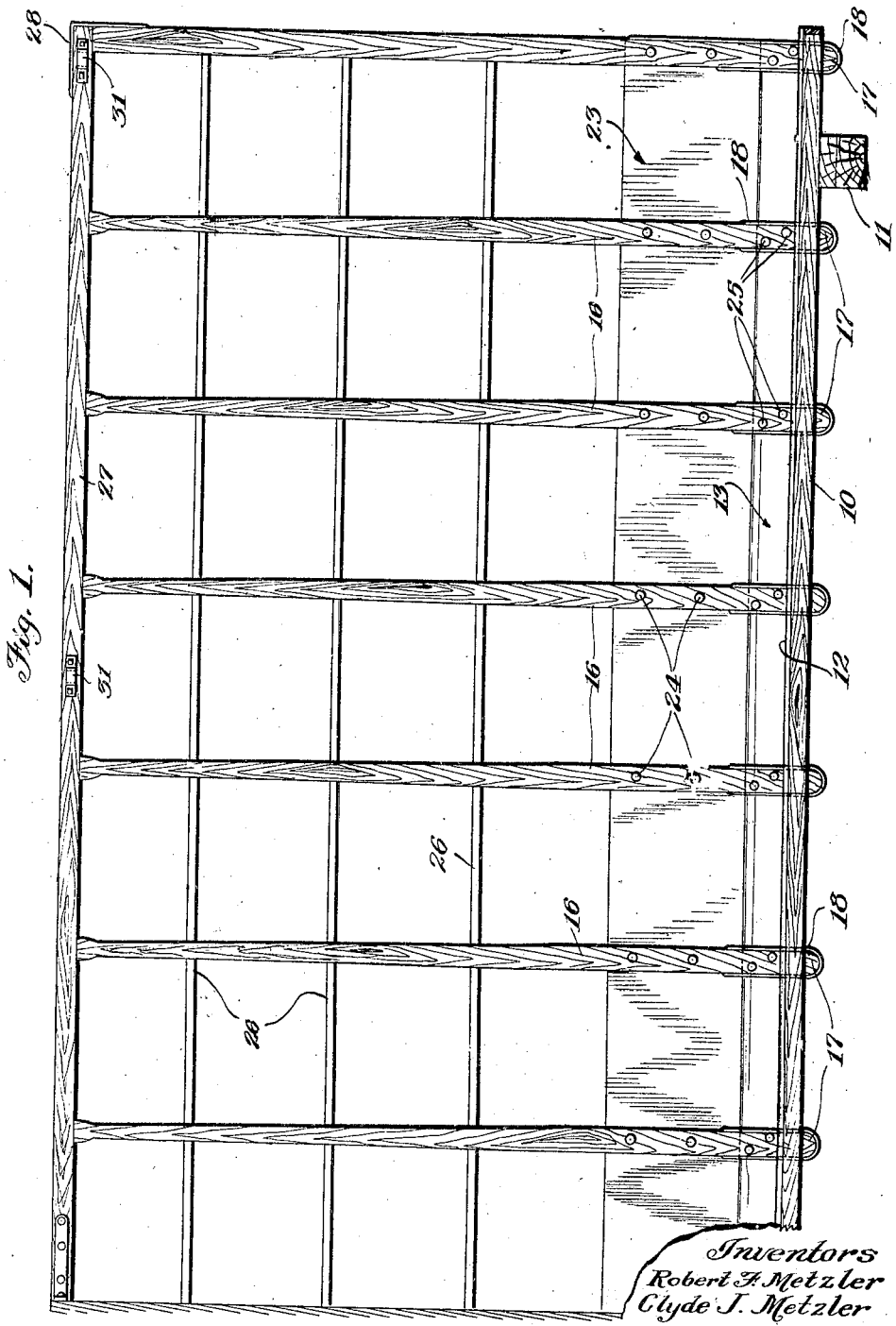

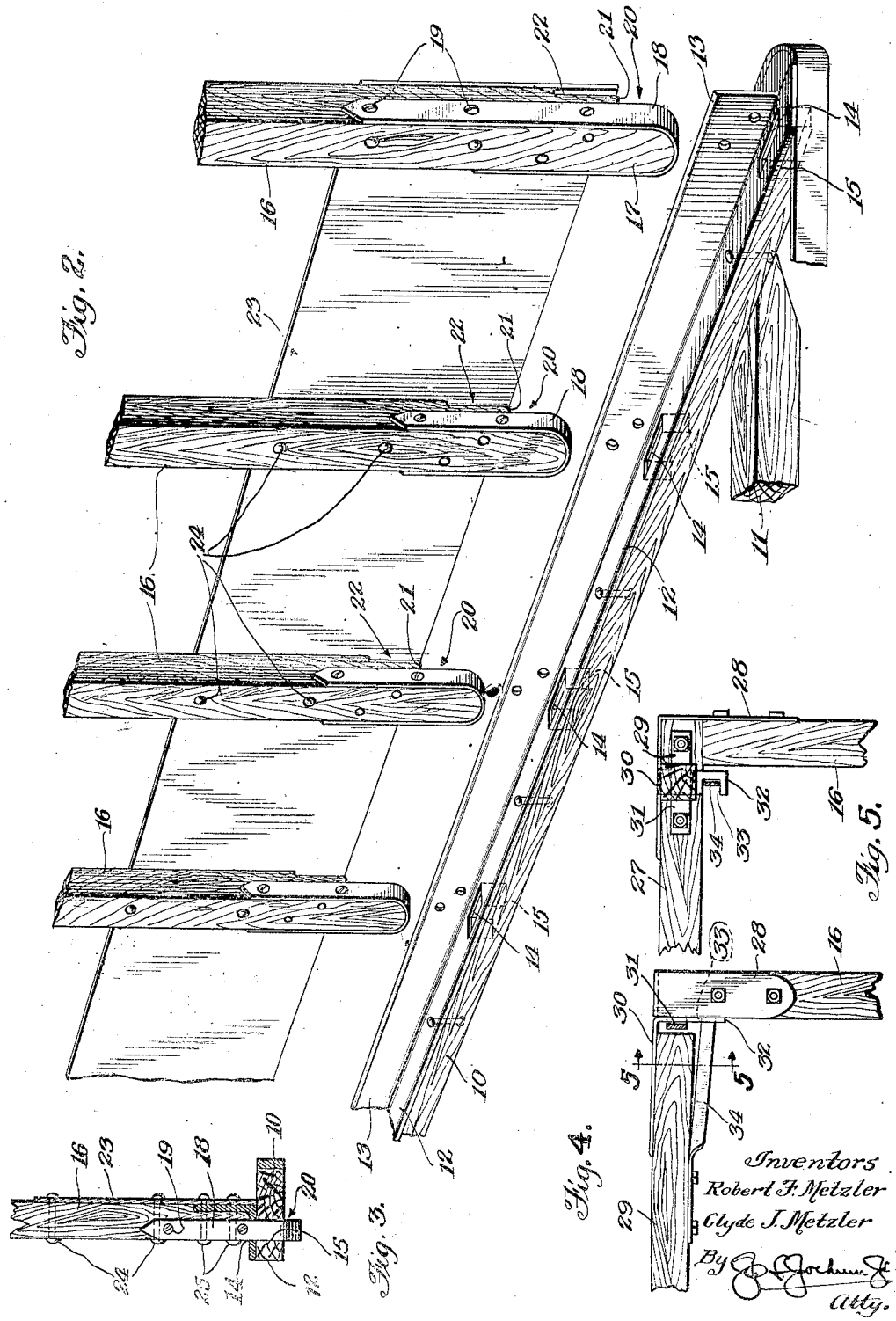

Patented June 8, 1926.

1,587,541

UNITED STATES PATENT OFFICE.

ROBERT F. METZLER AND CLYDE J. METZLER, OF CHICAGO, ILLINOIS.

AUTOMOBILE BODY CONSTRUCTION.

Application filed November 13, 1925. Serial No. 68,741.

This invention relates in general to automobile body construction and one of the objects of the invention is to provide an improved body of a construction commonly known as a solid stake construction and in which all of the stakes on the respective sides of the body are secured together so that the side may be placed in position as well as removed, as a unit, the stakes when in position being held and braced at their base against lateral movement by means of an angle bar or iron to which they are secured, thereby rendering it possible to ship the body in a knock down condition and at the same time necessitate a minimum amount of storage space.

A further object is to provide an improved construction of this character in which the angle iron or plate extends for substantially the entire length of the bottom of the body and will form a water tight joint by shedding the water and preventing it from settling at the bottoms of the stakes, thereby prolonging the life of the stakes and the adjacent portions of the automobile bottom by avoiding rotting.

A further object is to provide an improved fastening means for the cross bar or brace at the top and between the opposite sides of the body.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which Figure 1 is a view partly in side elevation and partly in section of a portion of one side of an automobile body constructed in accordance with the principles of this invention.

Figure 2 is a detail perspective view of a portion of one of the sides and stakes and a portion of the bottom of the automobile body, constructed in accordance with the principles of this invention, and showing the parts as being separated.

Figure 3 is a detail view in vertical section showing the manner of securing the stakes in position.

Figure 4 is a view partly in side elevation and partly in section of one of the cross bars or braces for the upper ends of the sides and showing the fastening means therefor.

Figure 5 is a detail sectional view taken on line 5—5, Figure 4.

Referring more particularly to the drawings the numeral 10 designates generally one of the side rails or other edge of the bottom of the body, and 11 one of the cross bars or rails extending transversely of the body and between the side rails.

Supported by the rail 10 and secured thereto in any desired or suitable manner is an angle bar or plate 12 having its upright portion 13 disposed adjacent the outside of the body. The plate 12 is provided with a plurality of stake apertures 14 therethrough which register with similar apertures 15 extending through the rail 10.

The upright portion 13 of the angle bar or plate 12 may be of any desired height and the bar or plate 12 extends for substantially the entire length of the side of the body. One of these plates is provided on each side of the body and as the construction of each side is the same the description of one side will apply as well to both.

The numeral 16 designates the usual upright stakes, any number of which may be provided according to the length of the body, and one of these stakes is provided for each of the apertures 14 in the plate or bar 12.

The stakes are of a size and configuration at their lower extremities 17 to fit within the apertures 14 and 15, and the lower edges of these extremities may, if desired, be reenforced or braced by means of strap iron 18 extending thereabout and secured in position by means of suitable fastening devices 19, such as screws, bolts, rivets or the like.

The outer face of each of the stakes is recessed as at 20 to form a shoulder 21 which, when the extremity 17 of the stake is inserted in the aperture 14, will rest upon the base or bottom portion of the bar or plate 12.

The lower extremity of each of the stakes is also recessed as at 22 so as to receive the upright portion of the angle bar or plate 12, as shown more clearly in Figure 3.

The stake 16 is of such a thickness that the outer face thereof will be substantially flush with the outer face of the upright portion 13 of the angle bar or plate 12 and secured to the stakes is a member 23 preferably in the form of sheet metal such as iron or the like, so as to connect all of the stakes 16 together to form a unitary structure of the side. The member or plate 23 may be secured to the stakes in any suitable manner such as by means of fastening bolts or rivets 24, any number of which may be provided.

The lower portion of the plate 23 extends over the recessed portion 22 of the stake so as to form a space therebetween for the reception of the potion 13 of the angle bar 12, and when the side embodying the stake 16 is placed in position as shown in Figure 3, the lower edge of the plate 23 will rest upon the bottom rail or sill 10. The side may be secured in position against accidental displacement in any desired or suitable manner such as by means of fastening devices 25 in the form of rivets, bolts or the like, which pass through the plate or member 23, the upright flange 13 of the angle iron 12 and the lower ends of the respective stakes 16.

With this construction it will be manifest that the side may be readily placed in position as a unitary structure and after being so placed it may be fastened by the fastening devices 25.

When it is desired to remove the side all that is necessary is to remove the fastening devices 25 and the entire side may be lifted out of position as a unit.

If desired, suitable slats or bars 26, any number of which may be provided, may be secured to the outer faces of the stakes 16 to assist in the formation of a rigid structure, and to the upper ends of the stakes may be connected bars or rails 27. If desired, angle brackets 28 may be provided for securing the ends of the stake and top rail 27 together. The top edges of the sides may be braced by means of cross bars or rails 29, any number of which may be provided and which are preferably of a length slightly less than the distance between the rails. Carried by the extremities of the rails or bars 29 is a hook shaped formation 30 adapted to enter a keeper 31 carried by the rail 27. The extremity 32 of the hook shaped device 30 is preferably provided with a recess 33 opening through one side thereof which is adapted to receive a spring device 34 carried by the cross bar or rail 29. The extremity 32 of the hook shaped device 30 projects below the rail 29 and the keeper 31 so that when it engages the keeper the spring 34 may be seated within the recess 33 to lock the rail 29 against accidental displacement.

When it is desired to remove the sides of the automobile body or the rail 29, all that is necessary is to deflect the spring 34 so that it will pass out of the recess 33, which will permit the hook shaped portion 30 to be disengaged from the keeper 31.

Any number of these cross bars 29 and fastening devices 30 may be provided according to the length of the body.

With this improved construction it will be manifest that there will not only be produced a rigid construction but the stakes 16 and the side structures will be rigidly braced at their bases against lateral movement with respect to the automobile body and at the same time the angle iron construction will shed the water thereby forming a water tight joint at the base of the stakes which will protect them and prevent them from rotting.

Furthermore the sides may be readily detached from the bottom and the whole structure shipped in a knock down condition, thereby necessitating a minimum amount of storage space and also facilitating in the shipment or transportation of the same.

With this construction it is also possible for the body to be readily assembled as the sides may be placed in position as a unit and readily fastened, thereby obviating the necessity of the employment of a skilled mechanic for assembling the structure.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. An automobile body construction embodying a supporting base member having a plurality of stake receiving openings therethrough, an angle iron resting thereupon and projecting thereabove, said iron having openings registering with the said stake openings, a plurality of upright stakes, means securing the stakes together to form a unitary side element, the extremities of said stakes being adapted to be simultaneously inserted in the respective said openings, and fastening devices passing through the upright portion of the said angle iron and the respective stakes for securing the parts together.

2. An automobile body construction embodying a supporting base member having a plurality of stake receiving opening therethrough, an angle iron resting thereupon and projecting thereabove, said iron having openings registering with the said stake openings, a plurality of upright stakes, means securing the stakes together to form a unitary side element, the extremities of said stakes being adapted to be simultaneously inserted in the respective said openings, the face of the stake adjacent the upright portion of said angle iron being recessed to receive the same, and fastening devices passing through the upright portion of the said angle iron and the respective stakes for securing the parts together.

3. An automobile body construction embodying a supporting base member having a plurality of stake receiving openings therethrough, an angle iron resting thereupon and projecting thereabove, said iron extending substantially the length of said base and having openings registering with the said stake openings, a plurality of upright stakes, a plate like member extending across and secured to the stakes for fastening them together and spaced apart to form a unitary side element, one of the extremities of the stakes being adapted to be inserted into the respective said registering openings, the face of the stake adjacent the upright portion of the angle iron being recessed to receive the latter, said plate like member extending across the said recess to form a space into which the upright portion of the angle iron projects, and fastening devices extending through the said plate, angle iron and stake.

In testimony whereof we have signed our names to this specification, on this 10th day of November, A. D. 1925.

ROBERT F. METZLER.
CLYDE J. METZLER.